United States Patent [19]
Sheynblat

[11] Patent Number: 6,009,551
[45] Date of Patent: *Dec. 28, 1999

[54] OPTIMUM UTILIZATION OF PSEUDORANGE AND RANGE RATE CORRECTIONS BY SATPS RECEIVER

[75] Inventor: Len Sheynblat, Belmont, Calif.

[73] Assignee: Trimble Navigation Limited, Sunnyvale, Calif.

[*] Notice: This patent is subject to a terminal disclaimer.

[21] Appl. No.: 09/033,887

[22] Filed: Mar. 3, 1998

Related U.S. Application Data

[63] Continuation of application No. 08/435,552, May 5, 1995, Pat. No. 5,748,651.

[51] Int. Cl.[6] .................................................. H03M 13/00
[52] U.S. Cl. .......................... 714/776; 714/798; 714/800
[58] Field of Search .................................. 714/798, 800, 714/776

[56] References Cited

U.S. PATENT DOCUMENTS

| | | | |
|---|---|---|---|
| 5,323,322 | 6/1994 | Mueller et al. | 364/449 |
| 5,748,651 | 5/1998 | Sheynblat | 371/49.1 |

*Primary Examiner*—Stephen M. Baker
*Attorney, Agent, or Firm*—Boris G. Tankhilevich

[57] ABSTRACT

The partial decoding algorithm for decoding the partially damaged differential satellite positioning system (SATPS) messages is disclosed. The algorithm is based on the modified parity test. The information included in the decoded messages can be used for the high level differential SATPS testing.

8 Claims, 12 Drawing Sheets

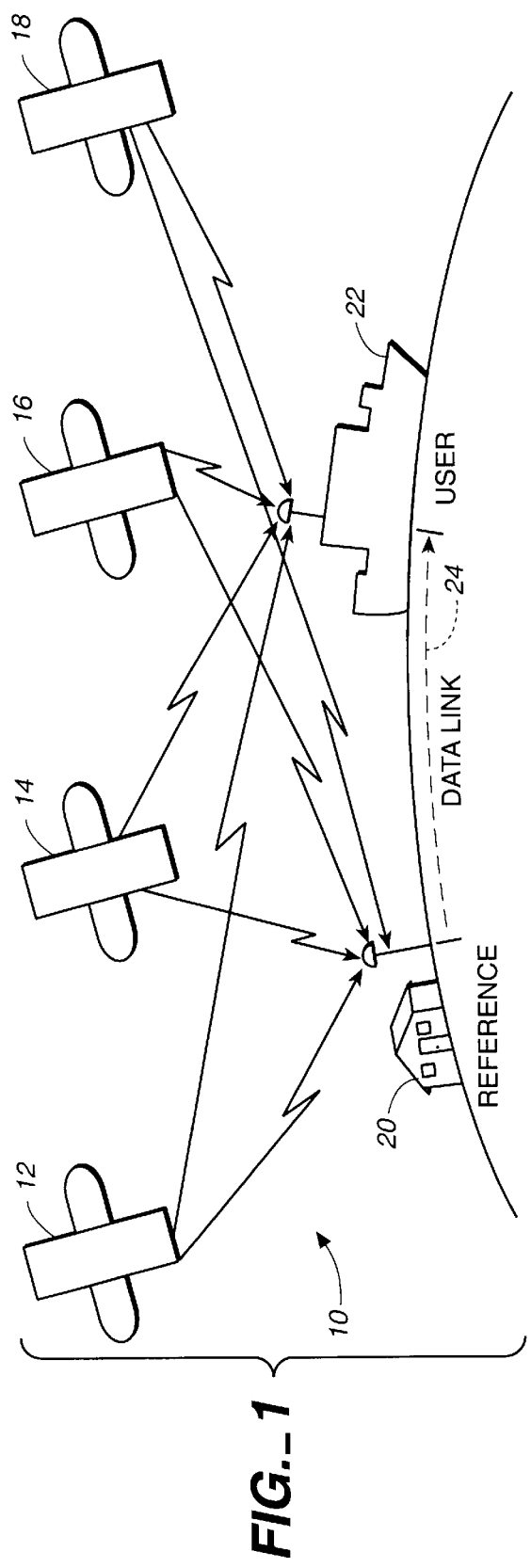
FIG._1
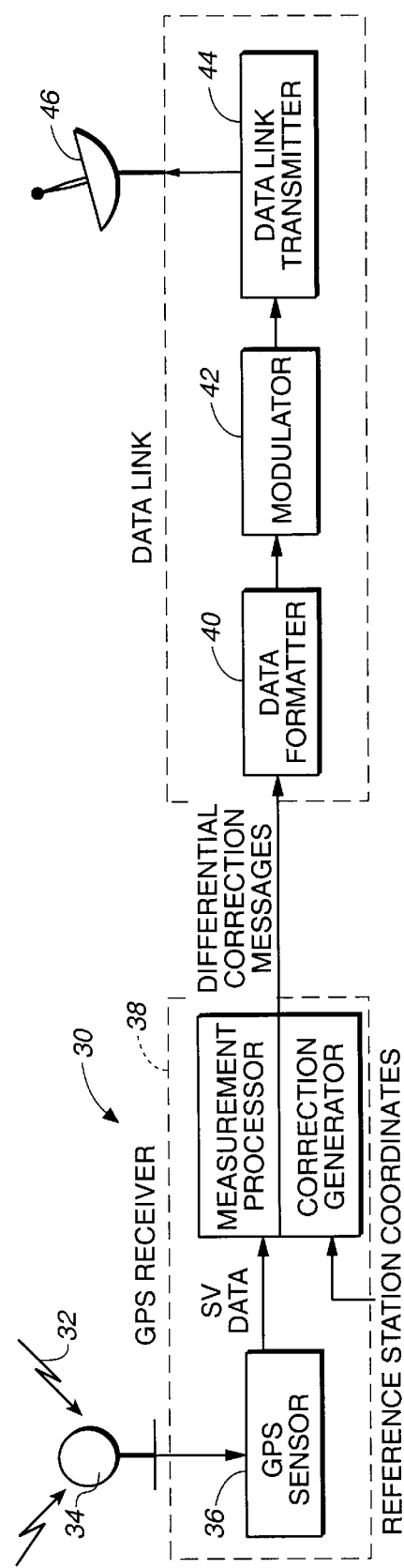
FIG._2

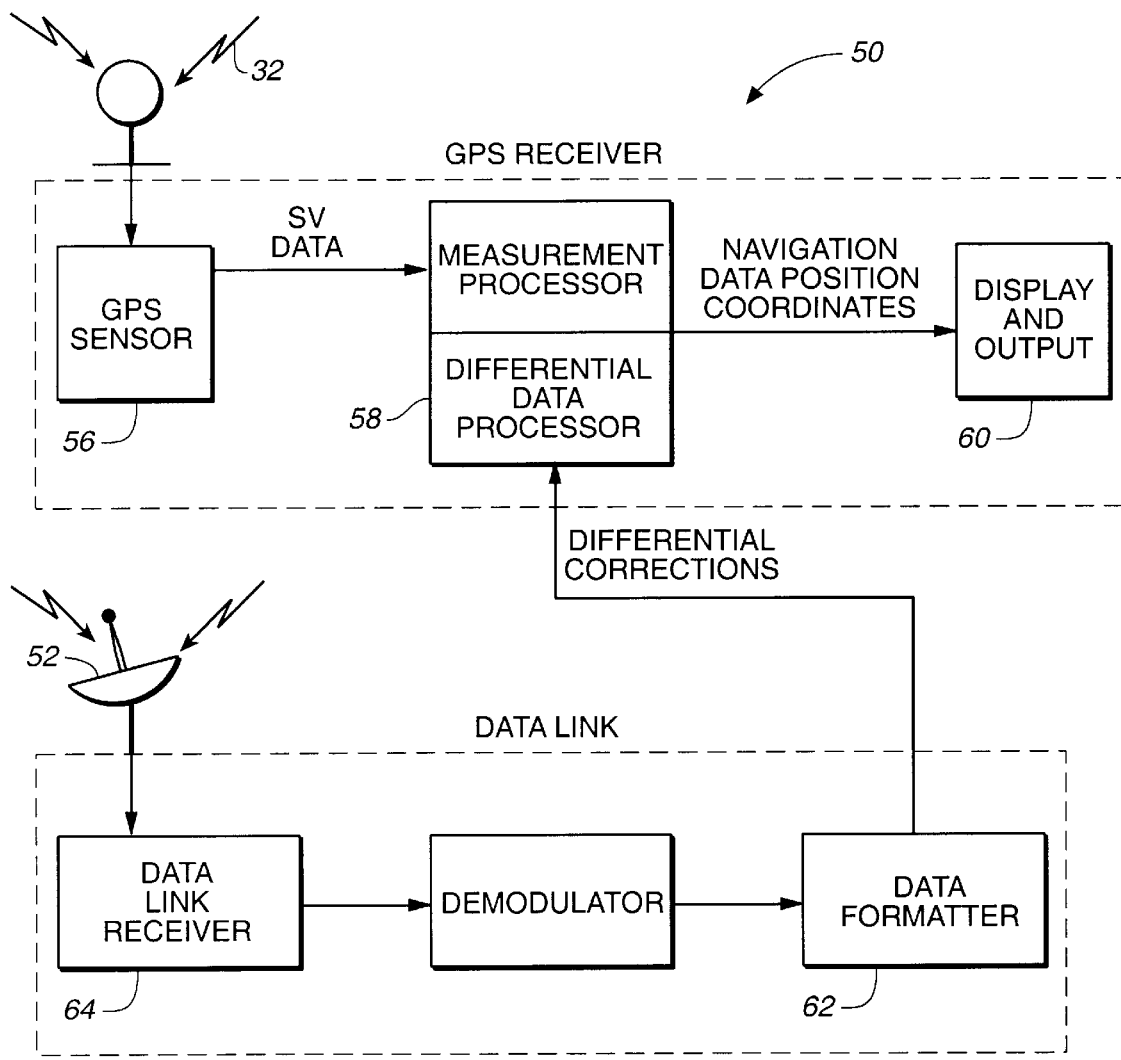
FIG._3

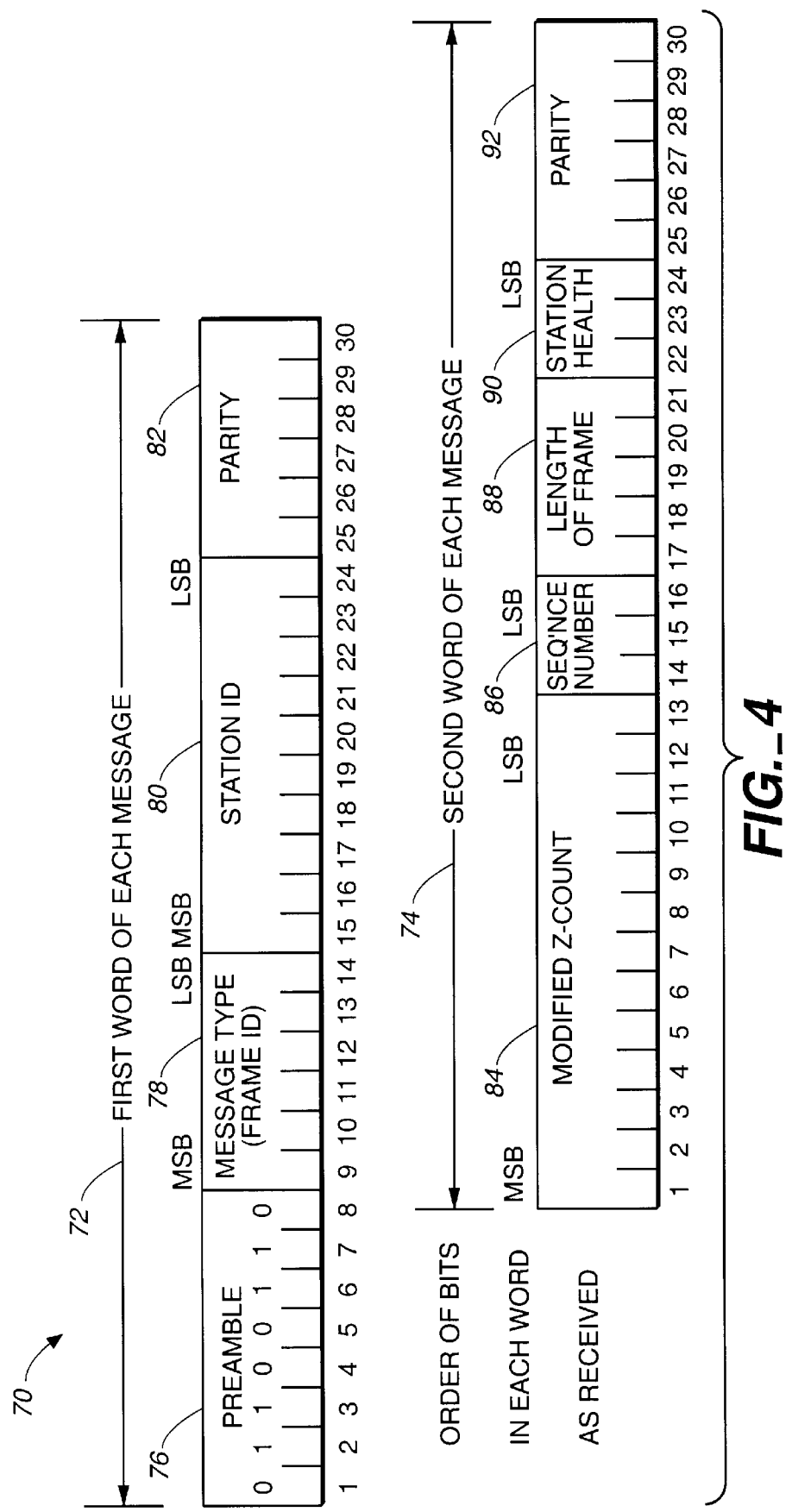
FIG._4

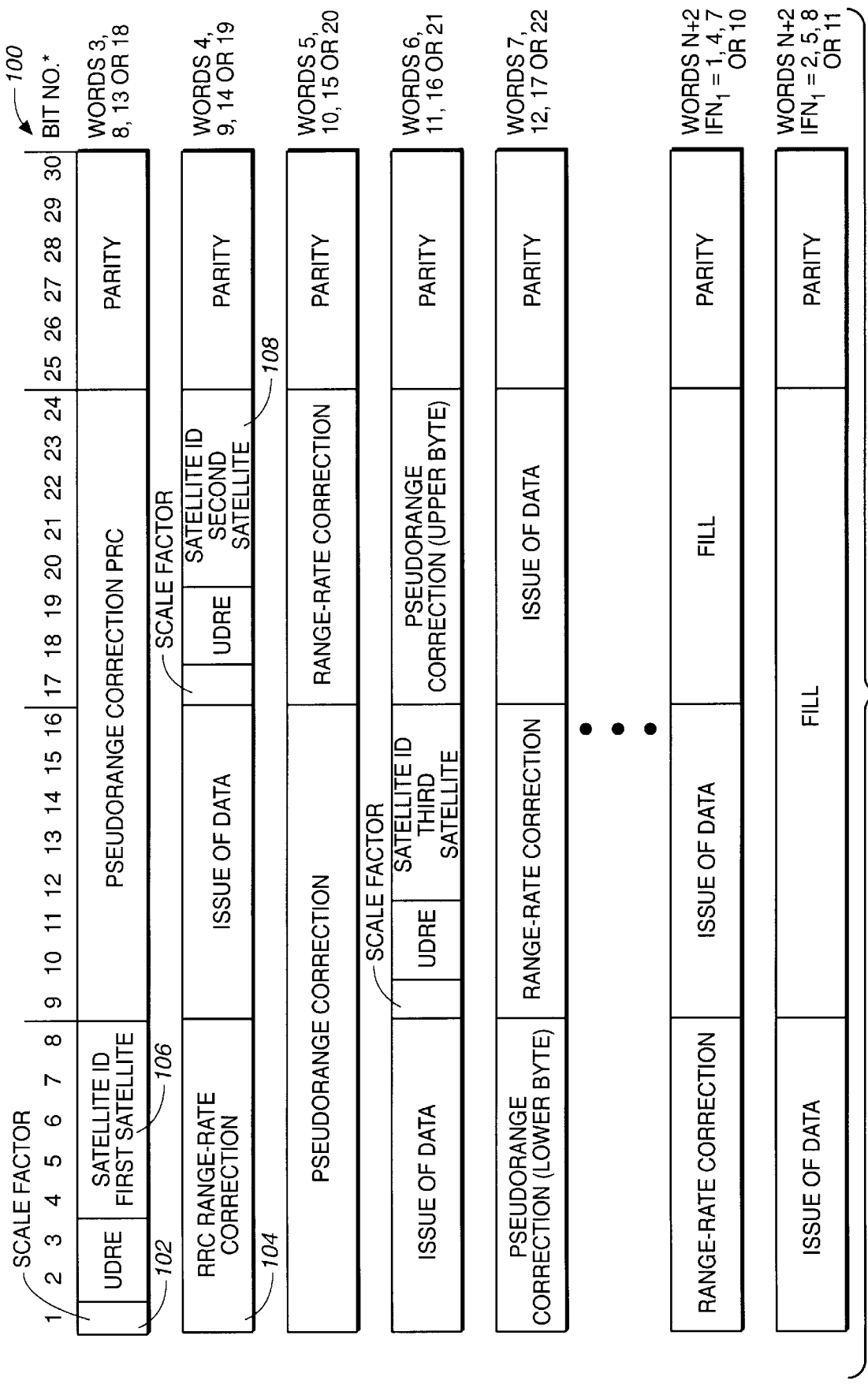
FIG._5

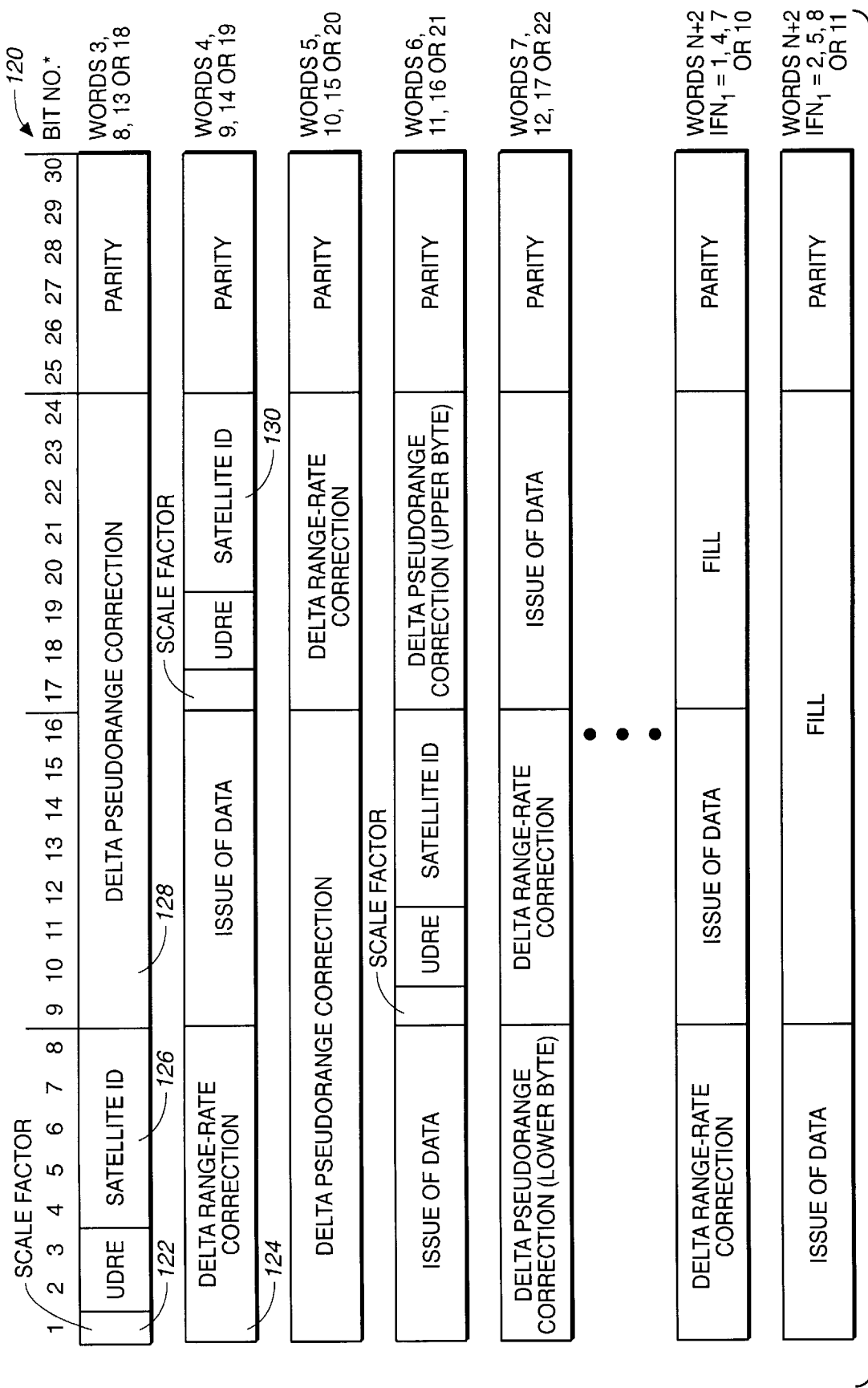
FIG._6

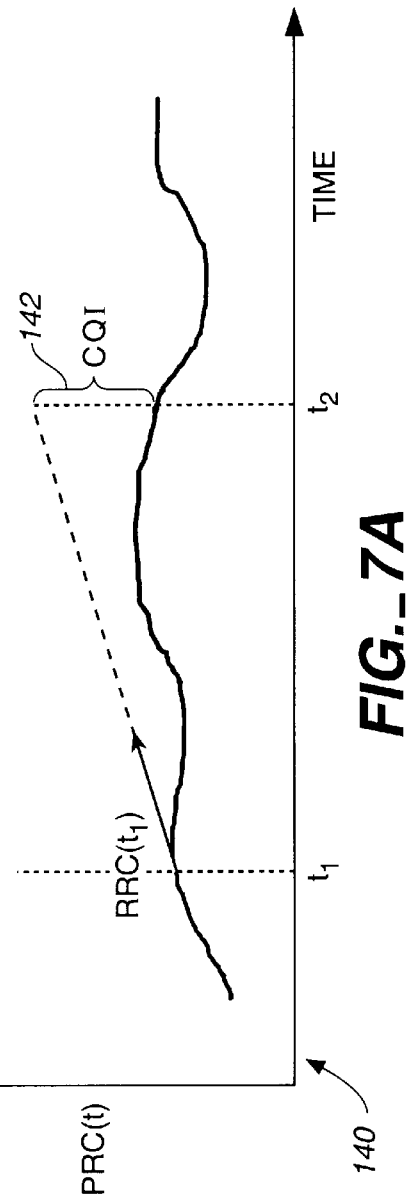
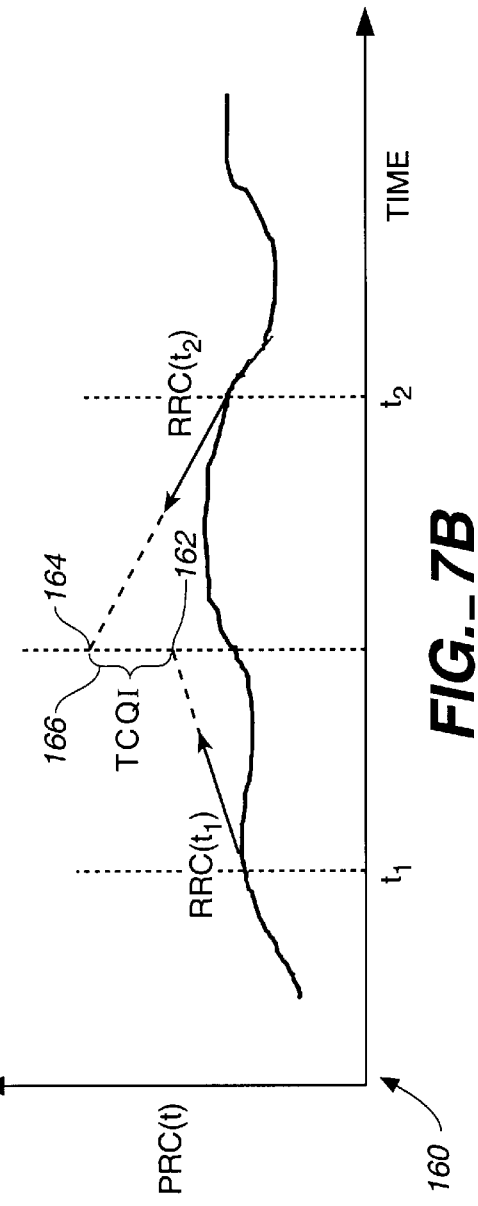

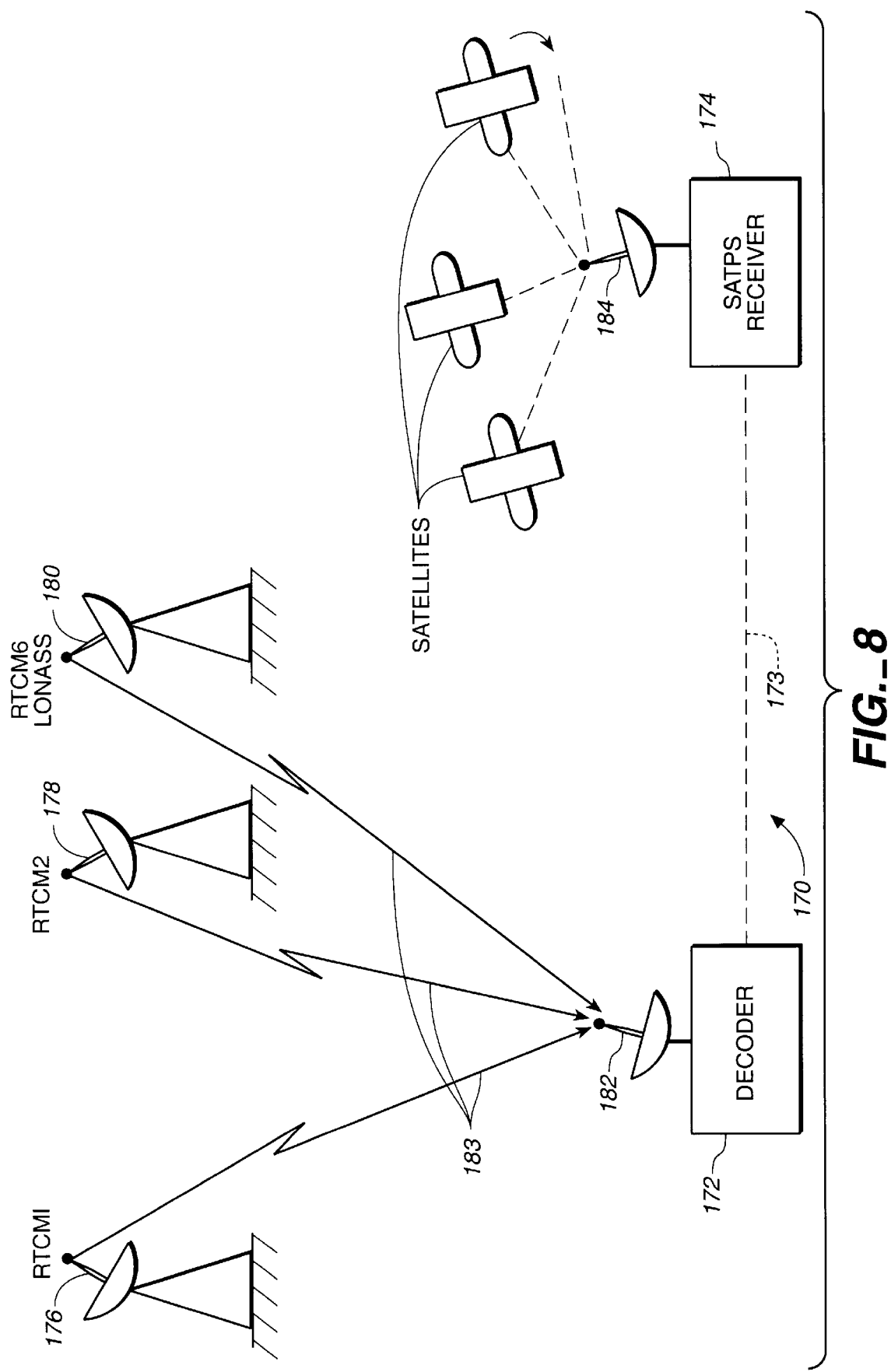
FIG._8

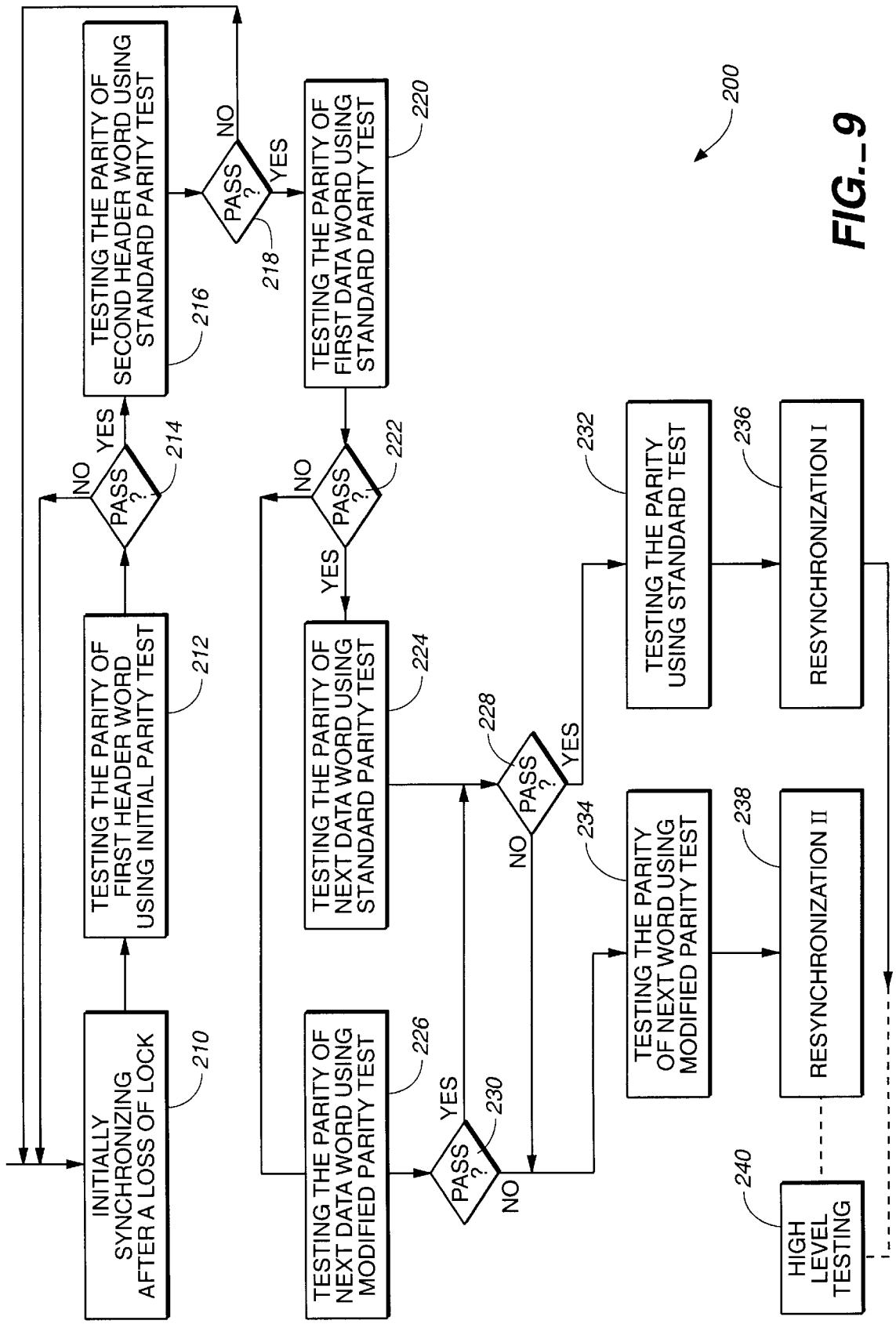
FIG._9

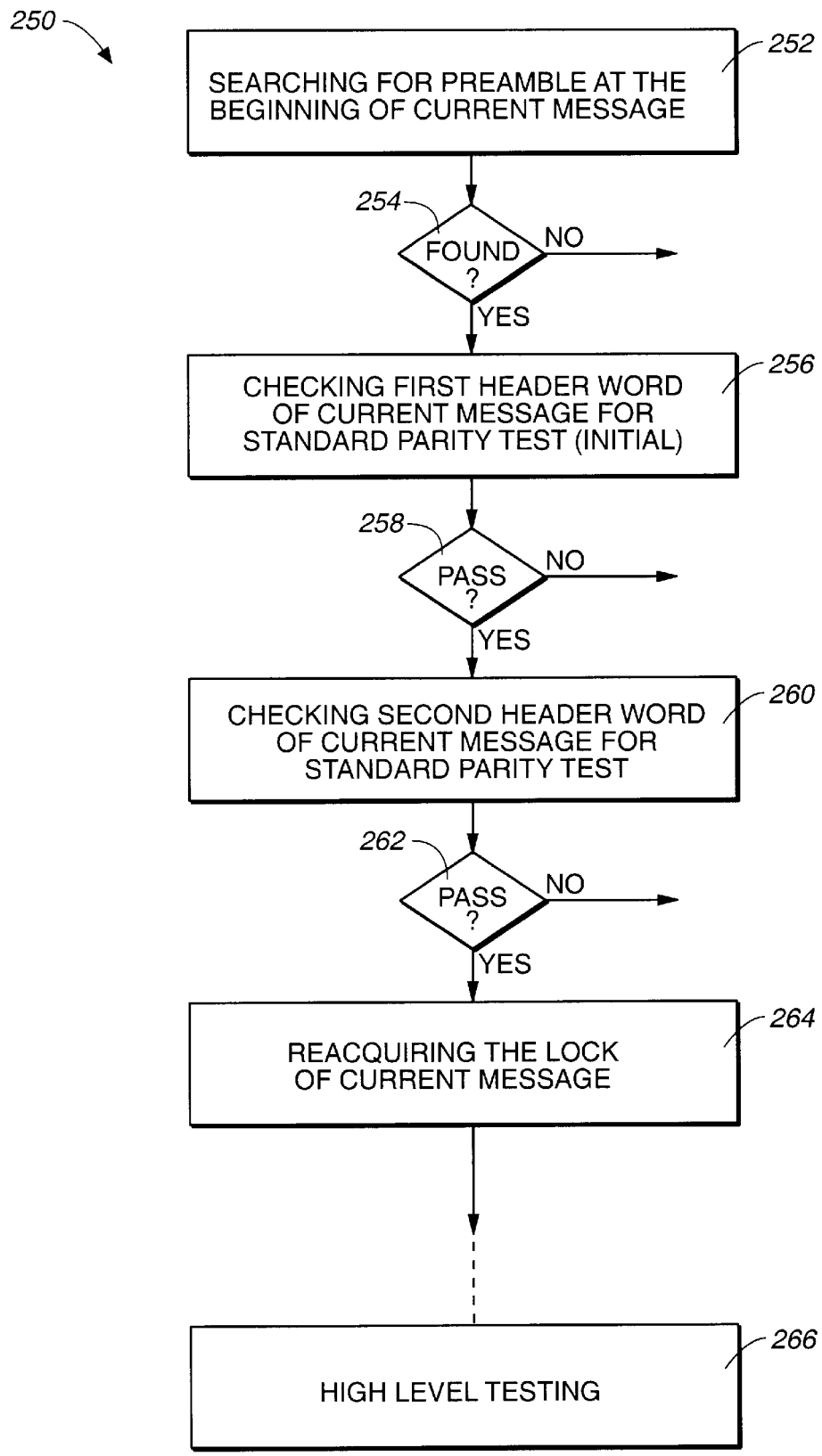
FIG._10

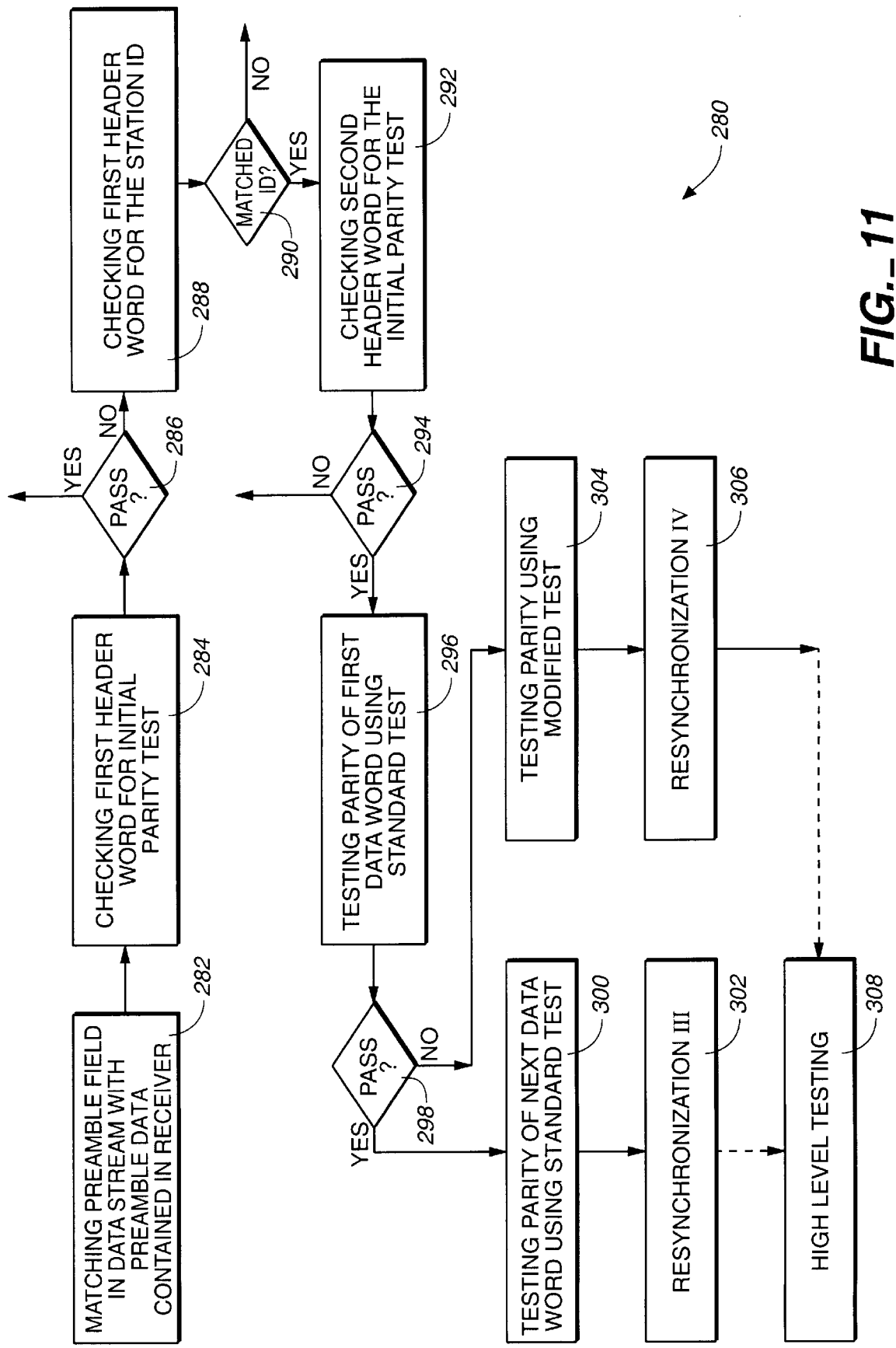
FIG._11

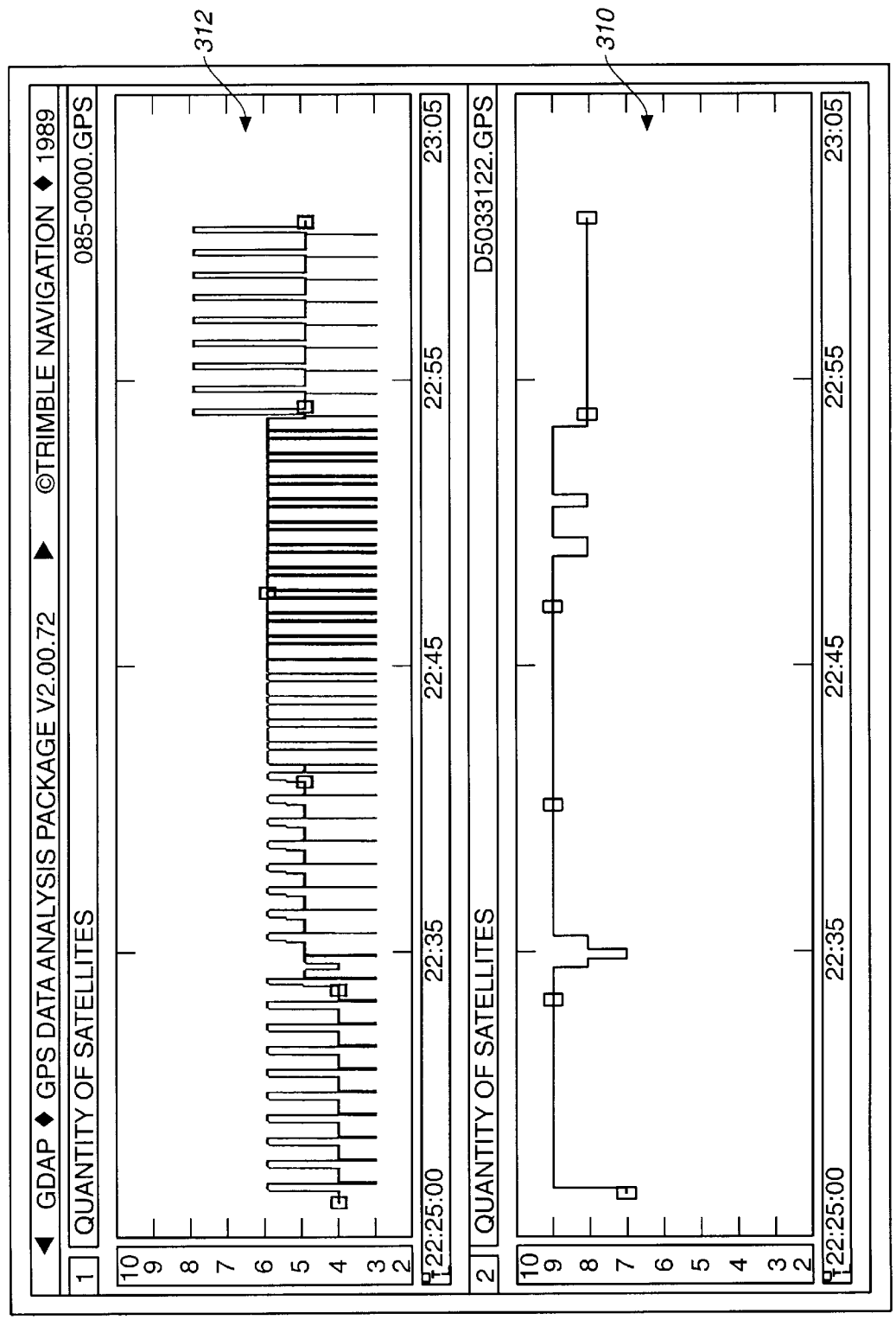
FIG._12

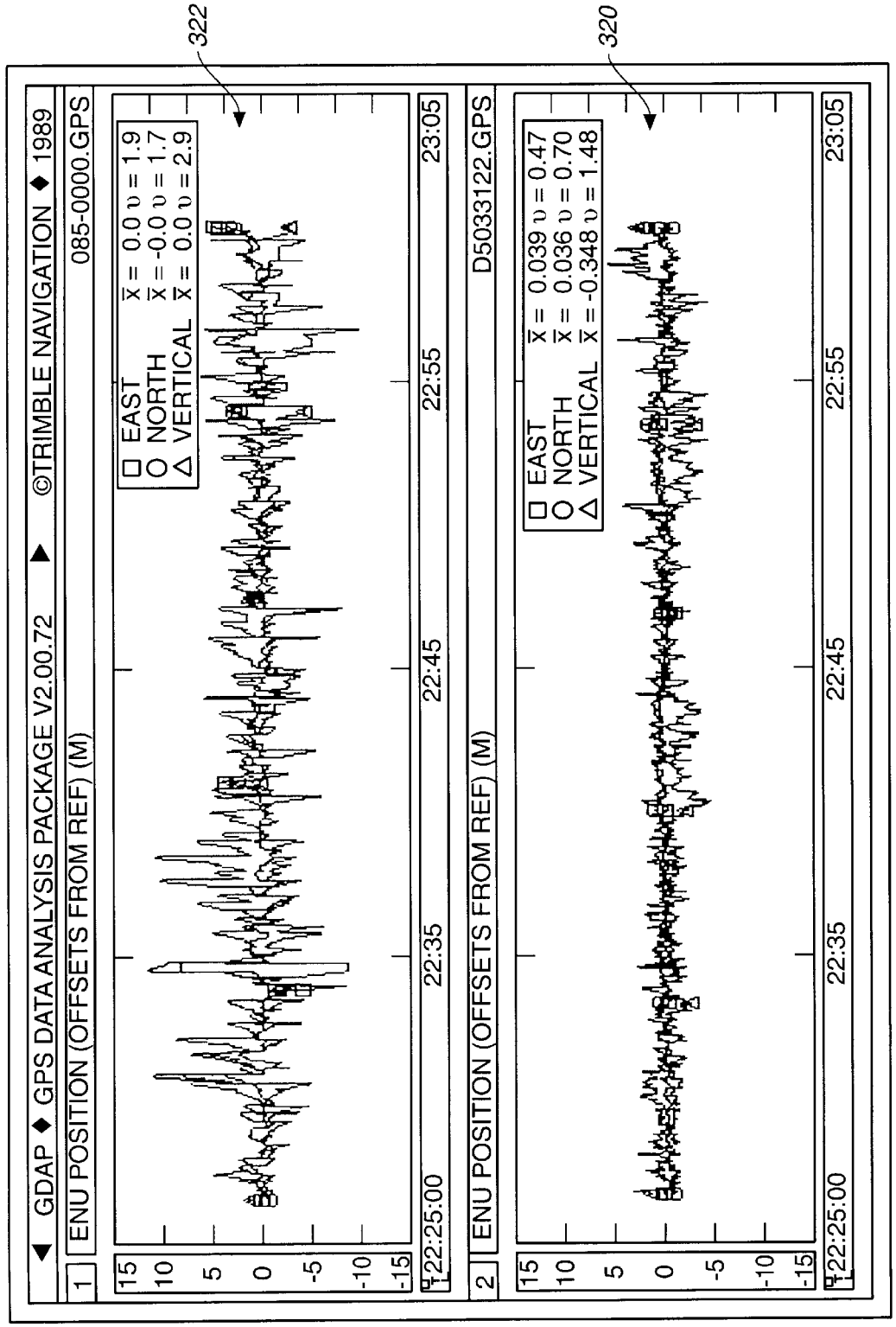
FIG._13

OPTIMUM UTILIZATION OF PSEUDORANGE AND RANGE RATE CORRECTIONS BY SATPS RECEIVER

This is a continuation of U.S. patent application Ser. No. 08/435,552, filed on May 5, 1995 now U.S. Pat. No. 5,748,651.

BACKGROUND

The global positioning system (GPS) is a United States funded satellite system including twenty four satellites in a constellation that beams highly accurate timed signals to earth. There are other satellite systems which can be used for the same purposes. For instance, the GLONASS satellite system maintained by Russia also beams the accurately timed signals to earth. The generic term used for designation of any possible satellite positioning system is a satellite positioning system (SATPS). SATPS receivers can process the satellite signals from anywhere in the world.

With differential GPS, a stationary reference receiver is placed at a very accurately known point location. The reference receiver generates corrections which are sent to a transmitter, which in turn broadcasts the corrections to users within the area of the transmission broadcast. A differential GPS user receives these corrections through a radio/modem and applies them to the direct GPS measurements. This gives the user a position measurement of a very high accuracy, e.g., from one meter to ten meters. Differential GPS works quite well to produce meter-level accurate navigation as far as 100 kilometers from the reference station. Most radiolocation and radionavigation systems can be operated in a differential mode, and consequently provide improved accuracy. The features of continuous service, high effective update rate, and potentially large coverage areas make it possible for differential GPS to provide "real-time" positional information that could be obtained previously only in a "post-processing" mode of operation. This combination of capabilities of differential GPS makes it very attractive for a variety of applications.

The differential GPS finds application in the Marine Navigation. Indeed, in the restricted channels of some harbors and inland waterways 8–10 meters accuracy is required and the utilization of the differential GPS is essential to meet this requirement.

There is a general problem relating to all differential GPS receivers that is addressed in the present invention. The differences between the received and expected values are transmitted from the Reference Station to the GPS receiver over a separate communication link to correct the GPS receiver pseudorange measurements before the fix is computed. During the atmospheric noise, lightning, storms, weather anomalies, or electromagnetic interference the messages transmitted from the Reference Station to the GPS receiver can be damaged. Also, some differential GPS systems do not allow the use of error correction codes to correct the data errors resulting from the imperfect data transmission from the Reference Station to the GPS receiver. For instance, the Radio Technical Commission for Maritime Services (RTCM) doesn't recommend to use a self-correction code because it would increase the bandwidth required for the transmission.

Thus, what is needed is a correction algorithm which would allow the differential GPS receiver to process the damaged differential correction messages and to recover the useful information included in the damaged differential correction messages.

SUMMARY

The present invention is unique because it introduces the algorithm that allows the differential GPS receiver to process the damaged differential correction messages as well as the undamaged messages.

The first aspect of the present invention is directed to a method of recovering data included in a damaged differential correction message using a partial decode algorithm. The method comprises the following steps: (1) locking on a current differential correction message; (2) assigning a standard parity check algorithm (SPCA) information to the current differential correction message, wherein the SPCA differential correction message passes a standard parity check algorithm; (3) assigning a partial decode algorithm (PDA) information to at least one PDA data word of the current damaged differential correction message, wherein at least one SP data word of the damaged differential correction message does not pass the standard parity check algorithm and passes the partial decode algorithm; and (4) utilizing the SPCA information and the PDA information at the higher level integrity testing of the current differential correction message.

In one embodiment, the step of locking on the current differential correction message further comprises the step of locking on a first header word of the current differential correction message.

In another embodiment, the step of locking on the current differential correction message further comprises the steps of: (a) matching a PREAMBLE field in the data stream with a PREAMBLE data included in the user receiver; (b) checking the first header word of the current differential correction message for an initial parity test if the PREAMBLE field in the data stream matches the PREAMBLE data included in the user receiver; (c) checking the first header word of the current differential correction message for a station ID if the first header word does not pass the initial parity test; (d) checking a second header word of the current differential correction message for the initial parity test if the station ID included in the message matches with the station ID included in the user receiver; and (e) acquiring the lock if the second header word passes the initial parity test and if the station ID included in the message header matches the station ID included in the user receiver.

In one embodiment, the step of assigning the second pass (SP) information further comprises the steps of: (a) checking whether the first header word passes the parity check using the initial parity test; (b) testing the second header word using the standard parity test if the first header word passes the initial parity test; (c) testing the parity of each data word following the PDA data word using the standard parity test if the second header word passes the standard parity test; (d) recording the data word as the PDA data word if the data word passes the standard parity test; (e) recording the data word as a non-PDA data word if the data word does not pass the standard parity test; (f) testing the parity of a current data word that immediately follows the non-PDA data word using a modified parity test; and (g) starting the resynchronization process if the last word in the frame as defined by the length of frame field in the second header word fails the standard test or the modified test depending on whether the preceding data word was the PDA data word or the non-PDA data word.

In another embodiment, the step of assigning the partial decode algorithm (PDA) information further comprises the steps of: (a) proceeding with a data word immediately following the non-PDA data word if the non-PDA data word is the last word in the frame, wherein the data word immediately following the last non-PDA data word in the frame is the first header word of the next message frame; (b) counting the number of consecutive non-PDA data words; and (c) resetting the algorithm and starting the resynchronization process again once the number of consecutive non-PDA data words exceeds some predetermined threshold.

In one embodiment, the message comprises a plurality of 30-bit words numbered 1, 2, ... M, (M is an integer), each 30-bit word includes d1, d2, ... d24, d25, d26, ... d29, d30 bits, wherein the bits d25 through d30 are the parity bits, and wherein the bits d29* and d30* indicate the last two parity bits of the previous word.

In one embodiment, the step of checking whether the first header word passes the parity check using the initial parity test comprises the following steps: (a) assuming that d29* and d30* bits are both zeroes, making the direct comparison of d1 through d8 bits to the PREAMBLE stored in the user receiver; (b) setting d30* to a one, inverting data bits d1 through d8, inverting the stored in the user receiver PREAMBLE, and making the inverted comparison of the inverted data bits d1 through d8 to the inverted PREAMBLE if the direct comparison fails; (c) computing the checksum based on d29*, d30* and d1 through d24 if either direct or inverted comparison does not fail; (d) matching the checksum with the parity bits included in the bits d25 through d30; (e) recomputing the checksum by setting d29* to a one if the match based on d29*, d30* and d1 through d24 is not found; and (f) checking the recomputed checksum for the match again.

In one embodiment, the step of testing the parity of each data word following the PDA data word using the standard parity test comprises the following steps: (a) computing the checksum based on d29*, d30* and d1 through d24; (b) checking the checksum for the match with the parity bits included in the bits d25 through d30; (c) assigning the PDA information to each data word if there is a match; and (d) assigning the non-PDA information to each data word if there is no match.

In one embodiment, the step of testing the parity of the current data word that immediately follows the non-PDA word using the modified parity test comprises the following steps: (a) modifying the non-PDA word by changing the last two bits of the non-PDA word, wherein the last two bits of the non-PDA word have four different sates, wherein the first state is a "0" state for the last but one bit d29*; and a "0" state for the last bit d30*, and wherein the second state is a "0" state for the last but one bit d29*, and a "1" state for the last bit d30*, and wherein the third state is a "1" state for the last but one bit d29*, and a "0" state for the last bit d30*, and wherein the fourth state is a "1" state for the last but one bit d29*, and a "1" state for the last bit d30*; (b) computing for the first state of the non-PDA word the checksum based on d29* and d30* and d1 through d24; (c) matching the checksum with the parity bits d25 through d30 for the first state of the non-PDA word; (d) repeating the steps (b–c) for the second state of the non-PDA word if there is no match for the first state of the non-PDA word; (e) repeating the steps (b–c) for the third state of the non-PDA word if there is no match for the second state of the non-PDA word; (f) repeating the steps (b–c) for the fourth state of the non-PDA word if there is no match for the third state of the non-PDA word; and (g) assigning the PDA information to the non-PDA word if for any of four states of the non-PDA word there is a match.

BRIEF DESCRIPTION OF THE DRAWINGS

FIG. 1 illustrates the differential GPS geometry.

FIG. 2 depicts a Reference Station block diagram.

FIG. 3 shows a user equipment block diagram

FIG. 4 is an illustration of a 2-word header for all messages.

FIG. 5 shows a type 1 message format.

FIG. 6 is a depiction of a type 2 message format.

FIG. 7A is a graphical illustration of the Correction Quality Indicator (CQI).

FIG. 7B is a depiction of the Trimble Correction Quality Indicator (TCQI).

FIG. 8 shows a message decoder combined with a GPS receiver which is able to receive the differential corrections from multiple Reference Stations.

FIG. 9 depicts the flow chart for the partial parity algorithm in the preferred embodiment.

FIG. 10 illustrates the flow chart of the resynchronization process.

FIG. 11 is a depiction of a flow chart for the partial parity algorithm in the second preferred embodiment.

FIG. 12 shows the quantity of satellites used in the user receiver position fix.

FIG. 13 illustrates the computed errors in the user position fix.

FULL DESCRIPTION OF THE PREFERRED EMBODIMENT

FIG. 1 illustrates the differential GPS geometry 10. The satellites 12, 14, 16, and 18 provide the satellite signals which are received by the differential Reference Station (RefSta) 20 and by the user receiver 22. The datalink 24 allows to transmit the differential corrections to the user that can calculate its position location with an improved accuracy.

FIG. 2 depicts the block diagram 30 of the RefSta. The RefSta includes a GPS receiver 36 with antenna 34, a data processor 38, a data link transmitter 44 with antenna 46, and interfacing equipment like data formatter 40 and modulator 42. The GPS receiver is carefully surveyed to determine its phase center position. The ideal RefSta receiver 36 has 12 nparallel channels that allow the ideal receiver to continuously receive signals from all satellites in view.

The user equipment is shown in FIG. 3. It includes a GPS receiver 56 with antenna 54, a data processor 58, a data link receiver 64 with antenna 52, and interfacing equipment. The data processor applies the corrections received from the RefSta to the pseudorange and pseudorange rate data measured by the receiver.

For each satellite employed by the user receiver, the correction obtained from the RefSta is added to the pseudorange measurements. The pseudorange correction itself is derived from the pseudorange and range rate corrections, adjusted to account for the time elapsed between the time of reception of the corrections and the time of the user pseudorange measurement, as follows:

$$PRC(t) = PRC(t(0)) + (RRC(t(0))*(t-t(0))); \quad (1)$$

where PRC(t) is the correction to be applied, PRC(t(0)) is the pseudorange correction from the message, RRC(t(0)) is the range-rate correction from the message, t(0) is the reference time of the correction, and t is the time associated with the pseudorange measurement.

In the differential mode of operation, a Reference Station (RefSta) generates the differential messages and transmits them to the remote user. The following discussion is applicable to all differential message formats with the emphasis on the Radio Technical Commission for Maritime Services (RTCM) Special Committee No. 104.

To date there are 6 of possible 64 message types defined, either tentatively or in final fixed form, retired or reserved. See RTCM Recommended Standards for Differential NAVSTAR GPS Service, Version 2.1, Published in Jan. 3, 1994 by RTCM, 655 Fifteenth St, NW, Suite 300, Washington, D.C. 20005, USA, that is incorporated herein by reference. The RTCM SC-104 standard defines the message formats and recommends on the user interface, which allows one to use a receiver together with a satellite or a radiobeacon link.

Message 1 transmits the differential GPS Corrections, message 2—Delta differential GPS Corrections, message 3—RefSta parameters, message 4—Surveying, message 5—Constellation Health, message 6—Null Frame, message 9—High Rate differential GPS Corrections, and so on. The messages are transmitted continuously with Message Type 6, Null Frame, used as a transmission fill, if the Reference Station has no other messages ready to send.

The general message format 70 is illustrated in FIG. 4 with details of the first two thirty-bit words of each frame or message type. Each frame is N+2 words long, N is an integer, wherein N words include the data of the message, and two words include the header of the message. The word size and parity algorithm are identical to that of the GPS navigation message as described in the document ICD-GPS-200 [NAVSTAR GPS/JPO, 1983], which is incorporated herein by reference.

Thus, the RTCM message format has 30 bit words (fixed size for GPS/GLONASS) (24 data and 6 parity bits) and utilizes GPS message parity algorithm. The RTCM message format, however, includes the variable frame length differential message format, whereas the GPS/GLONASS data format has fixed length subframes.

Each message comprises a two-word header followed by the data words. The message length varies with the message type as well as within the message type. Assuming 2 words per satellite (for Message Types 18 through 21) and a 24 satellite GPS constellation, the maximum message length comes to 50 words.

The first two words of each message include data that is pertinent to any type of message: Reference Station ID information (80), time of message in Modified Z-Count (84), and PREAMBLE information required for message synchronization. The Modified Z-Count is different from the GPS Z-Count in that the least significant bit (LSB) has a scale factor of 0.6 seconds instead of 6 seconds, to account for the variable length frames, and the range of the Z-count is only one hour in order to conserve bits. The reasoning behind this is that all differential GPS users will have already initialized via the GPS system and will know what the GPS time is.

Message synchronization can be achieved by the user while searching for a fixed 8-bit PREAMBLE 76 (identical to GPS) in the beginning of the first word 72. For instance, the RTCM Version 2.1 PREAMBLE is defined as 66 Hex ($102_{10}$).

Once the PREAMBLE is encountered, the decoding algorithm checks the parity of the first header word. If the first header word fails the parity test, it is assumed that the PREAMBLE bits were encountered by chance, and the search continues. For any algorithm to proceed with message decoding, the very first word of any message has to pass the parity test. The second header word also should pass the parity check, because it provides the length of message, which is important for partial decode rule.

FIG. 5 depicts type 1 message format that carries the differential corrections. This is the primary message type which provides the pseudorange correction PRC(t) for any time "t" according to eq. (1), where PRC(t(0)) is the 16 bit pseudorange correction, RRC(t(0)) is the 8-bit rate of change of the pseudorange correction (range rate correction), and t(0) is the 13-bit modified Z-Count of the second word. The pseudorange measured by the user (PRM(t)) is then corrected as follows:

$$PR(t)=PRM(t)+PRC(t); \quad (2)$$

where PR(t) is the differentially corrected pseudorange measurement that should be processed by the user equipment navigation filter.

The data transmitted for any single satellite is spread through two data words. Thus, for the type 1 message data corresponding to the satellite No. 1 (106) is carried by the first data word 102 and by the part of the second data word 104, wherein the data sent for the satellite No. 2 (108) starts in the second data word 104 (see FIG. 5). The same is true for the message type 2 that carries the delta differential corrections (see FIG. 6) and message type 9.

The message transmitted from the RefSta to a GPS/GLONASS user can get hit during transmission because of the atmospheric noise, lightning, storms, other weather anomalies, or electromagnetic interference. The self-corrected codes are not allowed to be used by some differential GPS systems. For instance, the Radio Technical Commission for Maritime services (RTCM) doesn't recommend to use the self-correction code because it would increase the bandwidth required for the transmission. Thus, there is a need to develop the partial decode algorithm that would allow one to salvage at least some information included in the hit message.

Provided that the RefSta generates differential pseudorange corrections PRCs and range rate corrections RRCs that are independent of the set of satellites used in the correction computation process (i.e., corrections do not "step" or "jump" when the satellite constellation switches), the partial decode algorithm can be applied at the remote station receiving differential corrections. The partial decode algorithm describes a method of checking a partially damaged message using a parity mechanism. This algorithm can be used by a differential satellite positioning system (DSATPS), wherein the partially damaged message is received by a rover. The method allows the user to recover data included in the damaged message. Each message includes a plurality of words, including a header and a plurality of data words following the header. The header includes a first header word and a second header word, wherein the first header word includes a specific PREAMBLE field, and wherein the second header word provides the message frame length information.

The flow chart depicted in FIG. 9 describes the partial decoding algorithm in the preferred embodiment (200). During the initial message frame synchronization or resynchronization after a loss of lock (step 210), the specific PREAMBLE field included in the first header word of the current message is matched against the PREAMBLE field included in the user receiver. The received message can include an RTCM1 message, an RTCM2 message, or an RTCMg (GLONASS) message. The match identifies the received information as the specific message to be locked on.

After the lock is acquired, the next step of the algorithm (212) indicates that the first header word should pass the parity check using the initial parity test. As it is mentioned above, each message includes a plurality of 30-bit words numbered $1, 2, \ldots M$, (M is an integer), wherein each 30-bit word includes a plurality of 30 bits $\{d1, d2, \ldots d24, d25, d26, \ldots d29, d30\}$. The bits $d25$ through $d30$ are the parity bits. The bits $d29^*$ and $d30^*$ indicate the last two parity bits of the previous word.

The initial parity test includes the following steps. At first, assuming that $d29^*$ and $d30^*$ bits are both zeroes, the direct comparison of $d1$ through $d8$ bits to the PREAMBLE stored in the user receiver is made. The next step is setting $d30^*$ to a one, inverting data bits $d1$ through $d8$, inverting the stored in the user receiver PREAMBLE, and making the inverted comparison of the inverted data bits $d1$ through $d8$ to the inverted PREAMBLE if the direct comparison fails. After that, the checksum based on $d29^*$, $d30^*$ and $d1$ through $d24$ is computed if either direct or inverted comparison does not fail. The checksum is matched with the parity bits included in the bits $d25$ through $d30$. If the match is not found, the checksum is recomputed based on $d29^*$, $d30^*$ and $d1$ through $d24$ by setting $d29^*$ to a one, and the recomputed checksum is checked for the match again.

If the first header word passes the initial parity test (step 214), the second header word is tested using the standard parity test (step 216). The second header word provides the frame length information which is vital for the partial decode algorithm. If the second header word passes the standard parity test (step 218), every data word being received is tested for the parity failure using the standard parity test (step 220). If the data word passes the test, the "pass" is recorded as a partial decode algorithm (PDA) information that identifies the part of the damaged message that can be recovered using the standard parity test. A standard parity check algorithm (SPCA) identifies undamaged messages, that is if a current differential correction message passes a standard parity check algorithm (SPCA), the message is considered to be undamaged. Both PDA and SPCA information can be used as useful information for a high level testing.

The standard parity test includes the following steps. The checksum is computed based on $d29^*$, $d30^*$ and $d1$ through $d24$; and the checksum is checked for the match with the parity bits included in the bits $d25$ through $d30$; wherein if there is a match the standard parity test has been passed, and wherein the standard parity test has been failed if there is no match.

If the standard parity test has been failed, a "hit" is recorded. This means that the "hit" part of the damaged message can not be recovered and used for future processing by using the standard means. However, in certain situations, even the "hit" part of the damaged message can be recovered and used for further processing as the PDA information using the both the standard and a modified tests.

The parity of each data word following the "pass" data word is tested using the standard parity test (step 232). The parity of the current data word that immediately follows the"hit" word is tested using the modified parity test (step 234).

The modified parity algorithm includes a step of modifying a "hit" word by changing the last two bits of the "hit" word, wherein the last two bits of the "hit" word have four different sates.

The first state is a "0" state for the last but one bit $d29^*$; and a "0" state for the last bit $d30^*$. The second state is a "0" state for the last but one bit $d29^*$, and a "1" state for the last bit $d30^*$. The third state is a "1" state for the last but one bit $d29^*$, and a "0" state for the last bit $d30^*$, wherein the fourth state is a "1" state for the last but one bit $d29^*$, and a "1" state for the last bit $d30^*$.

For the first of these four embodiments of the "hit" word, the checksum based on $d29^*$ and $d30^*$ and $d1$ through $d24$ is computed and matched with the parity bits $d25$ through $d30$. If there is no match for the first embodiment, the checksum based on $d29^*$ and $d30^*$ and $d1$ through $d24$ is computed and matched with the parity bits $d25$ through $d30$ for the second of these four embodiments of the "hit" word If there is no match for the second embodiment, the same procedure is repeated for the third embodiment. If there is no match for the third embodiment, for the forth embodiment the same procedure is repeated. If for any of four embodiments there is a match the modified parity test has been passed, and wherein if for all four embodiments there is no match the modified parity test has been failed.

In the preferred embodiment, if the last word in the frame as defined by the length of frame field in the second header word fails the parity test (standard test or modified test depending on whether the preceding data word was a "pass" or "hit" word), the synchronization is assumed to be lost and the resynchronization process starts again (step 236 or step 238).

The resynchronization process (step 250) comprises the following steps. (See FIG. 10). At first, the PREAMBLE at the beginning of the current message is searched (step 252). If the PREAMBLE is found and the preceding data word was a "hit" word, the first header word is checked for the initial parity test that does not require the knowledge of the last two bits $d29^*$ and $d30^*$ (both bits $d29^*$ and $d30^*$ are assumed to be zeroes) of the last "hit" data word of the preceding message (step 212). If the preceding word was a "pass" word, the first header word is checked for the standard parity test. (Step 256). If the first header word passes the initial parity test (or the standard parity test), the second header word is checked for the standard parity test (step 260). The lock is reacquired (step 264), if the PREAMBLE in the first header word of the current message is found, and the first header word of the current message passes the initial (or standard) parity test, and the second header word of the current message passes the standard parity test. For each header word and for each data word the "pass" or the "fail" grade is assigned for the purposes of the higher level testing of the differential corrections (step 266).

In another preferred embodiment, the partial decoding algorithm can proceed with the next data word as if the word that failed the test was not the last word in the frame. If this is the case, the next word should be the first header word of the next message frame. In this embodiment, the counter of the consecutive word "hits" can be used to "reset" the algorithm and to start the resynchronization process again once the number of word "hits" exceeds some predetermined threshold.

In one more preferred embodiment, the flow chart of the partial decode algorithm (280) is depicted in FIG. 11. The first step (282) is a step of matching the PREAMBLE field in the data stream with the PREAMBLE data included in the user receiver. If the PREAMBLE is recognized, the next step (284) is to check the first header word for the initial parity test. If the first header word does not pass the initial parity test, the algorithm checks the first header word for the station ID (step 288). If the station ID included in the message matches with the station ID included in the user receiver, the second header word is checked for the initial parity test (step 292). The lock is assumed to be acquired if the second header word passes the initial parity test and if the station ID included in the message header matches with the station ID included in the user receiver. The steps (296 through 308) of the algorithm (280) are the steps already disclosed above for the preferred embodiment (200) of the partial decode algorithm depicted in FIG. 9. The station ID can be stored as the previously received station ID. A new station ID can be entered by the user.

The "pass"/"fail" information is used at the higher level integrity testing of the differential corrections. If there is no confidence in the differential data because some of the words in the particular message were identified as the "hit" words, there is a need for integrity check of the differential data for the satellite in question. Even if there is confidence in the differential data because the words in the current message satisfied the parity tests, there is still a need for the integrity check because the differential corrections might not be generated correctly in the first place by the particular RefSta.

The high level tests are based on the information included in the previous and current corrections. There are several possible implementations of this test logic. In one embodiment, the test measures the Correction Quality Indicator (CQI), wherein the test is based on the information included in the current pseudorange correction (PRC), in the current range rate correction (RRC), and in the previous PRC projected to a current time tag. Time t1 is synchronized with the Modified Z-Count for a PRC which was generated at t1; and time t2 is the Modified Z-Count of the current correction received for the tested satellite (or tested RefSta). The Modified Z-Count is defined as the time of the start of the frame as well as the reference time for the message parameters and provides the time into the hour (0 through 3599.4 seconds) and is sent in units of 0.6 seconds. The CQI test (see FIG. 7A) comprises the steps of computing CQI according to the following formula:

$$CQI=PRC_{t2}-[PRC_{t1}+RRC_{t1}*(t2-t1)]; \quad (3)$$

The computed CQI value can be compared with the threshold value T(FAR), wherein the T(FAR) is the threshold value based on a false alarm rate and confidence interval. If the current CQI exceeds the threshold value T(FAR) then a failure is declared and the corrections for the tested satellite (or a combination of tested satellites) are marked as invalid for further use in the user receiver differential solution.

In another preferred embodiment, the test measures the Trimble Correction Quality Indicator (TCQI). The Trimble test is based on the information included in the current pseudorange corrections (PRC), and in the current range rate correction (RRC) projected to some time t3=(t1+t2)/2, wherein time t1 is synchronized with the Modified Z-Count for a PRC which was generated at t1, and time t2 is the Modified Z-Count of the current correction received for the tested satellite (or RefSta). The Trimble test is also based on the information included in the previous PRC and RRC projected forward to time t3, wherein t3 can be defined anywhere between t1 and t2. TCQI is valid at time t3 in the middle of the interval defined by the Modified Z-Counts t2 and t1. The method uses all of the correction data included in two consecutive messages for a particular tested satellite (or RefSta). The TCQI test (see FIG. 7B) method comprises the step of computing a TCQI value according to the following formula:

$$TCQI=PRC_{t2}-RRC_{t2}*(t2-t1)/2-[PRC_{t1}+RRC_{t1}*(t2-t1)/2]; \quad (4)$$

The computed TCQI value is compared (in the next step) with the threshold value T(FAR), wherein the T(FAR) is the threshold value based on a false alarm rate and confidence interval. If the TCQI exceeds the threshold value T(FAR) then a failure is declared and the corrections for the tested satellite (or a combination of tested satellites) are marked as invalid for further use in the user receiver differential solution.

The simplest message decoder device combined with the SATPS receiver which can be use for the implementation of the above disclosed partial decode algorithm is depicted in FIG. 8. The apparatus (170) is designed for partial decoding of the damaged messages transmitted for the differential mode of operation by a number of Reference Stations (RefSta) that transmit different messages like RTCM1 (176), RTCM2 (178), and GLONASS RTCM (180). The device comprises at least one partial message decoder (172) for decoding the encoded data transmitted by different Reference Stations (RefSta). The device further comprises a differential satellite positioning system (SATPS) receiver (174) that receives the raw positioning data from the SATPS and receives the decoded differential corrections from the partial message decoder (172) for improving the raw positioning data transmitted by the SATPS. The device also includes at least one communication link (173) connecting at least one partial message decoder (172) and the SATPS receiver.

The decoder (172) is designed to accept the encoded RTCM stream of data, decode this data, and output the differential data packets. The definition for the packet can be flexible as long as it includes the useful information. The decoder can pass the encoded RTCM information to the differential SATPS receiver that can use this data.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A method of recovering data included in a damaged differential correction message using a partial decode algorithm, said method comprising the steps of:

locking on a current differential correction message;

testing said current message by using a plurality of standard parity tests and a modified parity test; and utlilizing said testing information at the higher level integrity testing of said current differential correction message.

2. The method of claim 1, wherein said step of locking on said current differential correction message further comprises the step of:

locking on a first header word of said current differential correction message.

3. The method of claim 1, wherein said step of locking on said current differential correction message further comprises the steps of:

matching a PREAMBLE field in the data stream with a PREAMBLE data included in the user receiver;

checking said first header word of said current differential correction message for an initial parity test if said PREAMBLE field in the data stream matches said PREAMBLE data included in the user receiver;

checking said first header word of said current differential correction message for a station ID if said first header word does not pass the initial parity test;

checking a second header word of said current differential correction message for the initial parity test if the station ID included in the message matches the station ID included in the user receiver; and acquiring the lock if said second header word passes the initial parity test and if the station ID included in the message header matches with the station ID included in the user receiver.

4. The method of claim 1, wherein said step of testing said current message by using said plurality of standard parity tests and said modified parity further comprises the steps of:

checking whether the first header word passes the parity check using an initial parity test;

testing the second header word using the standard parity test if the first header word passes the initial parity test;

testing the parity of each data word following the PDA data word using the standard parity test if the second header word passes the standard parity test;

recording said data word as the PDA data word if said data word passes the standard parity test;

recording said data word as a non-PDA data word if said data word does not pass the standard parity test;

testing the parity of a current data word that immediately follows the non-PDA data word using a modified parity test; and starting the resynchronization process if the last word in the frame as defined by the length of frame field in the second header word fails the standard test or the modified test depending on whether the preceding data word was the PDA data word or the non-PDA data word.

5. The method of claim 1, wherein said step of testing said current message by using said plurality of standard parity tests and said modified parity test further comprises the steps of:

proceeding with a data word immediately following a non-PDA data word if the non-PDA data word is the last word in the frame, wherein said data word immediately following the last non-PDA data word in the frame is the first header word of the next message frame;

counting the number of consecutive non-PDA data words; and resetting the algorithm and starting the resynchronization process again once the number of consecutive non-PDA data words exceeds some predetermined threshold.

6. The method of claim 4, wherein said message comprises a plurality of 30-bit words numbered 1, 2, . . . M, (M is an integer), and wherein each said 30-bit word includes d1, d2, . . . d24, d25, d26, . . . d29, d30 bits, and wherein the bits d25 through d30 are the parity bits, and wherein the bits d29* and d30* indicate the last two parity bits of the previous word, and wherein said step of checking whether the first header word passes the parity check using the initial parity test further comprises the steps of:

assuming that d29* and d30* bits are both zeroes, making the direct comparison of d1 through d8 bits to the PREAMBLE stored in the user receiver;

setting d30* to a one, inverting data bits d1 through d8, inverting the stored in the user receiver PREAMBLE, and making the inverted comparison of the inverted data bits d1 through d8 to the inverted PREAMBLE if the direct comparison fails;

computing the checksum based on d29*, d30* and d1 through d24 if either direct or inverted comparison does not fail;

matching the checksum with the parity bits included in the bits d25 through d30;

recomputing the checksum by setting d29* to a one if the match based on d29*, d30* and d1 through d24 is not found; and checking the recomputed checksum for the match again.

7. The method of claim 4, wherein said message comprises a plurality of 30-bit words numbered 1, 2, . . . M, (M is an integer), and wherein each said 30-bit word includes d1, d2, . . . d24, d25, d26, . . . d29, d30 bits, and wherein the bits d25 through d30 are the parity bits, and wherein the bits d29* and d30* indicate the last two parity bits of the previous word, and wherein said step of testing the parity of each said data word following the PDA data word using the standard parity test further comprises the steps of:

computing the checksum based on d29*, d30* and d1 through d24;

checking the checksum for the match with the parity bits included in the bits d25 through d30;

assigning the PDA information to each said data word if there is a match; and assigning the non-PDA information to each said data word if there is no match.

8. The method of claim 4, wherein each said message comprises a plurality of 30-bit words numbered 1, 2, . . . M, (M is an integer), and wherein each said 30-bit word includes d1, d2, . . . d24, d25, d26, . . . d29, d30 bits, and wherein the bits d25 through d30 are the parity bits, and wherein the bits d29* and d30* indicate the last two parity bits of the previous word, and wherein said step of testing the parity of the current data word that immediately follows the non-PDA word using the modified parity test further comprises the steps of:

(a) modifying the non-PDA word by changing the last two bits of the non-PDA word, wherein the last two bits of the non-PDA word have four different sates, wherein the first state is a "0" state for the last but one bit d29*; and a "0" state for the last bit d30*, and wherein the second state is a "0" state for the last but one bit d29*, and a "1" state for the last bit d30*, and wherein the third state is a "1" state for the last but one bit d29*, and a "0" state for the last bit d30*, and wherein the fourth state is a "1" state for the last but one bit d29*, and a "1" state for the last bit d30*;

(b) computing for the first state of the non-PDA word the checksum based on d29* and d30* and d1 through d24;

(c) matching the checksum with the parity bits d25 through d30 for the first state of the non-PDA word;

(d) repeating the steps (b–c) for the second state of the non-PDA word if there is no match for the first state of the non-PDA word;

(e) repeating the steps (b–c) for the third state of the non-PDA word if there is no match for the second state of the non-PDA word;

(f) repeating the steps (b–c) for the fourth state of the non-PDA word if there is no match for the third state of the non-PDA WORD; and (g) assigning the PDA information to the non-PDA word if for any of four states of the non-PDA WORD there is a match.

* * * * *